UNITED STATES PATENT OFFICE.

JULIUS R. POND, OF NEW HARTFORD, CONNECTICUT.

IMPROVEMENT IN CONDENSING MILK.

Specification forming part of Letters Patent No. 41,090, dated January 5, 1864.

*To all whom it may concern:*

Be it known that I, JULIUS R. POND, of New Hartford, county of Litchfield, and State of Connecticut, have discovered or invented certain new and useful Improvements in Condensing Milk; and I do hereby declare that the same is described and represented in the following specification, and to enable others to make and benefit therefrom I will proceed to describe it.

The object of this improvement is to preserve the original quality and taste of the milk after it is put up for market, and to prevent any scalded taste from the condensing process.

My improvement consists simply in the employment of oleine, of butter, or other material or article which will secure the same result, viz., coating the surface of the vessel in which the milk is placed for being condensed, and thereby preventing (by proper care) the liability of burning or scalding of the milk, which renders it to many very distasteful, and secures by the use thereof the original quality of the milk. My process otherwise is much the same as now in use for condensing milk.

What I claim, and desire to secure by Letters Patent, is—

The employment of oleine or its equivalent in the process of condensing milk.

JULIUS R. POND.

Witnesses:
SAMUEL WOLCOTT,
JEREMY W. BLISS.